United States Patent [19]

Colthorpe et al.

[11] Patent Number: 4,736,310

[45] Date of Patent: Apr. 5, 1988

[54] PAGE MAKE-UP SYSTEM

[75] Inventors: Steven N. Colthorpe; Christopher C. M. House; William J. Pickering, all of Barnet, England

[73] Assignee: Centurfax Limited, Barnet, England

[21] Appl. No.: 672,872

[22] Filed: Nov. 19, 1984

[30] Foreign Application Priority Data

Nov. 18, 1983 [GB] United Kingdom ............... 8330869

[51] Int. Cl.[4] ................. H04N 1/46; G09G 1/14; G01J 3/50
[52] U.S. Cl. .......................... 364/526; 340/747; 358/75; 364/518
[58] Field of Search ............... 364/526, 521, 518; 340/747; 358/75, 78

[56] References Cited

U.S. PATENT DOCUMENTS

| | | | |
|---|---|---|---|
| 3,778,811 | 12/1973 | Gicca et al. | 340/747 |
| 4,037,249 | 7/1977 | Pugsley | 358/76 |
| 4,090,243 | 5/1978 | Kotera et al. | 364/526 |
| 4,110,826 | 8/1978 | Möllgaard et al. | 364/526 |
| 4,189,743 | 2/1980 | Schure et al. | 358/75 |
| 4,189,744 | 2/1980 | Stern | 358/75 |
| 4,319,268 | 3/1982 | Yamada | 358/75 |
| 4,414,636 | 11/1983 | Ueda et al. | 364/526 |
| 4,419,691 | 12/1983 | Sing et al. | 358/75 |
| 4,462,043 | 7/1984 | Saitou | 358/75 |
| 4,481,594 | 11/1984 | Staggs et al. | 364/521 |
| 4,482,893 | 11/1984 | Edelson | 340/747 |
| 4,496,989 | 1/1985 | Hirosawa | 358/75 |
| 4,505,589 | 3/1985 | Ott et al. | 364/526 |
| 4,528,642 | 7/1985 | Waller | 340/747 |
| 4,536,848 | 8/1985 | d'Entremont et al. | 364/521 |
| 4,626,838 | 12/1986 | Tsujioka et al. | 340/747 |

FOREIGN PATENT DOCUMENTS 2099656 12/1982 United Kingdom.
2117902 10/1983 United Kingdom.

OTHER PUBLICATIONS

"Texture and Reflection in Computer Generated Images", Blinn and Newell, *Tutorial Computer Graphics*, Booth, editor, IEEE NY, NY, 1979.

"Superpaint ... The Digital Animator", *Datamation*, May 1979, vol. 25, No. 5, by Richard G. Shoup, pp. 150–156.

Primary Examiner—Parshotam S. Lall
Assistant Examiner—Kevin J. Teska
Attorney, Agent, or Firm—Young & Thompson

[57] ABSTRACT

Color separations for use in page make-up are produced by scanning an outline original in a color scanner to obtain a first output with high spatial resolution, modifying the output for reception by a video graphic system, generating a second full color range output with lower spatial resolution by use of the manual input means of the system, with reference to a display on the system monitor derived from the first output, combining the first and second outputs to obtain an output with the high spatial resolution and the full color range, and producing the separations by feeding the combined output to the expose side of the color scanner.

20 Claims, 6 Drawing Sheets

| 5 | 3 | 1 |
|---|---|---|
| 7 | ▨ | 2 |
| 8 | 6 | 4 |

BIS = 0
BIL = 0
BIF = 1

| 1 | 3 | 5 |
|---|---|---|
| 2 | ▨ | 7 |
| 4 | 6 | 8 |

BIS = 0
BIL = 1
BIF = 1

| LAST LINE AND NEXT PIXEL ADDRESS | CURRENT LINE AND NEXT PIXEL ADDRESS | NEXT LINE AND NEXT PIXEL ADDRESS |
|---|---|---|
| LAST LINE AND CURRENT PIXEL ADDRESS | CURRENT LINE AND CURRENT PIXEL ADDRESS | NEXT LINE AND CURRENT PIXEL ADDRESS |
| LAST LINE AND LAST PIXEL ADDRESS | CURRENT LINE AND LAST PIXEL ADDRESS | NEXT LINE AND LAST PIXEL ADDRESS |

SELECTION PRIORITY TO FIND COLOUR IN AN OUTLINE VIDEO GRAPHIC PIXEL.

FIG.7

| 8 | 6 | 4 |
|---|---|---|
| 7 | ▨ | 2 |
| 5 | 3 | 1 |

BIS = 0
BIL = 0
BIF = 0

| 4 | 6 | 8 |
|---|---|---|
| 2 | ▨ | 7 |
| 1 | 3 | 5 |

BIS = 0
BIL = 1
BIF = 0

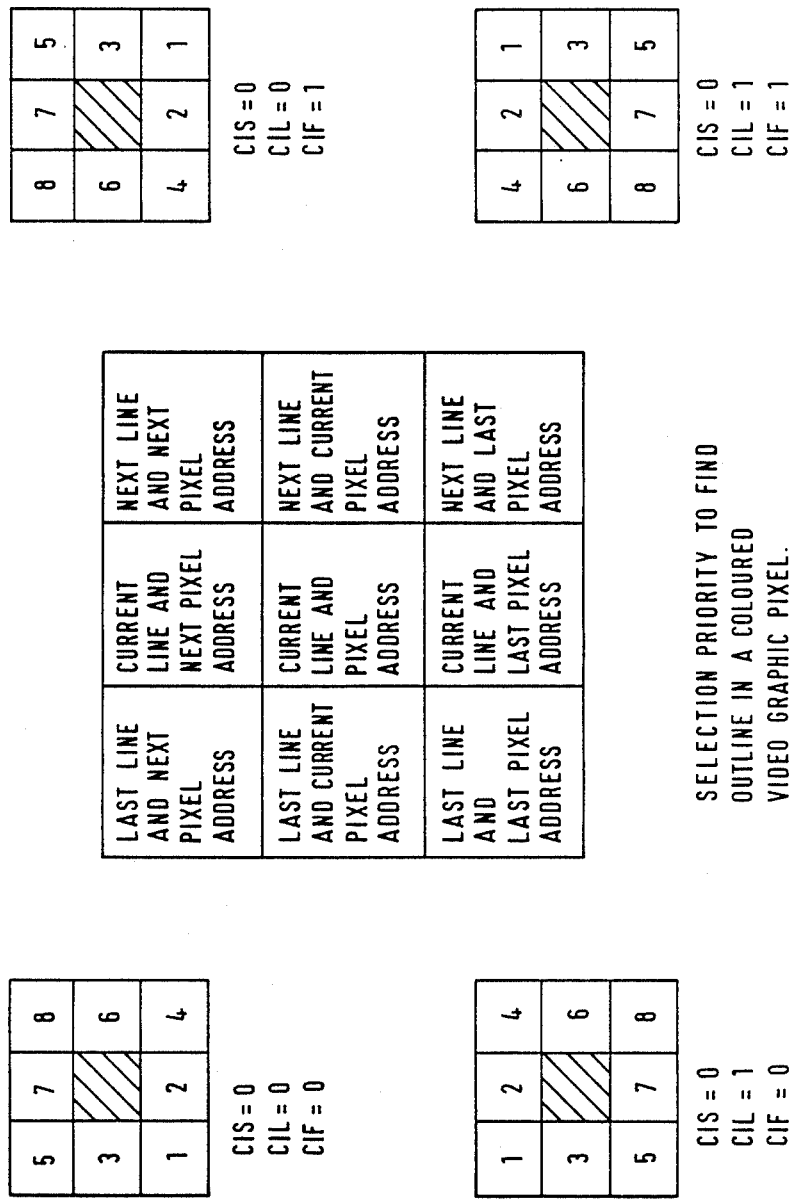

PAGE MAKE-UP SYSTEM

BACKGROUND OF THE INVENTION

The invention relates to the make-up of pages for reproduction.

For a variety of kinds of publication, it is desired to reproduce pages which include material of different kinds, for example, picture area, of which the originals are photographs or pieces of original artistic work, together with background tints, borders and text and perhaps logos. For reproduction, a set of color separations of the entire page, usually in cyan, magenta, yellow and black respectively, has to be produced.

In a conventional page make-up process, color separations for each of the picture areas are prepared. Masks providing the borders, tints, and the like, also required are then produced by manual and photographic means. The masks and the picture area separations are next combined by means of a contact frame to obtain the final product, that is, the set of separations for the whole page. The process cannot be performed quickly, the generation of the complete masks being particularly time consuming, with the result that the process as a whole is expensive.

Computerized systems for page make-up have therefore been developed. In the use of these, the first stage comprises the scanning by a graphic arts drum scanner of all the material to be included in the final page apart from contributions to be generated by the operator. The data generated by the scanner is supplied to a computer for recording in digital form in a suitable storage medium for example hard disc. The operator's contribution is made by means of a plotting table, or a cathode ray tube (CRT) monitor with a tablet or digitizer.

Where a plotting table is used, a planning film is exposed at the same time as the original material is scanned. The film obtained is mounted on the table, in a position corresponding to the required position on the completed page of the image it represents. This position is then entered into the computer through a keyboard or by use of a cursor. When all required images have been positioned in this way, the operator then enters into the computer store the additional material, for example, text, tints or borders, required to complete the page. Either when the operator has finished, or in parallel with his work, the computer assembles, pixel by pixel, a new record in its store which represents the final set of separations for the full page.

Where a monitor is used, the operator calls up data from the pre-scanned records and positions it where required on the CRT or display unit. Tints and borders are then introduced by use of a stylus on the tablet or by way of a keyboard. The final result is the same, a record generated pixel by pixel which represents the entire area of the separations for the required page.

Such page make-up systems are very versatile but they are also very complex and therefore expensive.

It is therefore an object of the invention to provide a method and a means for generating masks which permit the separations for page reproduction to be prepared in a simple and economical manner.

It is a further object of the invention to provide circuit arrangements whereby a color scanner and a video graphic system can be employed in the generation of separations for use in page make-up.

SUMMARY OF THE INVENTION

The present invention thus provides a method of producing color separations for use in page make-up, the method comprising the steps of providing a first output comprising high spatial resolution signals representing a line original with a limited range of color, providing a second output comprising low spatial resolution signals representing a greater color range, and combining the first and second outputs to provide a combined output for production of the color separations, the combined output having substantially the high spatial resolution of the first output and the color range of the second output.

The invention also provides a method of producing color separations for use in page make-up, the method comprising the steps of generating a high spatial resolution first output representing an outline comprising relatively complex features of the required page, supplying the first output to a video graphic system including display means for display of the outline by the display means, operating the video graphic system to generate a second output, the second output representing the outline, optionally with the addition of one or more features composed only of lines parallel to the pages edges, and color to be added to the outline, combining the first and second outputs in an interpolator device, and supplying the combined first and second outputs to an output device to produce the required color separations.

The invention further provides an apparatus for producing color separations for use in page make-up, the apparatus comprising means for generating a first output representing an outline of features to be included in the required page, the first output having high spatial resolution and restricted color range, means for transmitting the first output to a video graphic system, the video graphic system having display means for providing a display derived from the first output and means for selectively generating a lower resolution second output representing at least one of an outline feature to be incorporated in the outline and colors to the outline, the second output having lower spatial resolution and an extended color range, means for combining the first ad second outputs to provide a high spatial resolution output with the extended color range, and means employing the combined output for producing the color separations.

The invention can thus be carried into effect by scanning an outline original containing all the complex features of a required page in the input or analysis side of a conventional color scanner. The outline will normally comprise a black or dark outline on a lighter background.

The resulting first output, which will have the high spatial resolution necessary for producing the required separations, is then transferred to a conventional video graphic system, to be displayed on the system display means, normally a cathode ray tube (CRT) color monitor. The resolution of the color scanner is typically much higher than that of the video graphic system and means is provided for overcoming the difficulties which would result from this difference. The invention thus provides anti-aliasing means which enables the output of the scanner analysis side to be handled by the video graphic system, by selective reduction of the relatively large volume of data contained in the first output to a volume compatible with the video graphic system resolution. Thus, the anti-aliasing circuit can be arranged to average the voltages from all the scanner pixels that fall within the much larger area of each video graphic pixel to provide a signal which the video graphic system can handle. If the majority of the scanner pixels contain the black or dark color of the outline, the video graphic system receives a signal corresponding to a black video graphic pixel, and if such scanner pixels are in a minority, the video graphic system receives a signal indicating the white or lighter background color of the original.

The signals obtained in this way are fed to a computer for the video graphic system for storage, for example, in a random access momery (RAM). An image of the original outline is displayed on the display monitor of the video graphic system and the operator can then make use of the normal manual input facilities of the video graphic system to generate a second output of combination, during the output scan, with the output of the scanner analysis side. The manual input facilities can thus be used to add to the outline any simple features not contained in the original outline representation, the limitations of the video graphic systems requiring these features to be such as may be constructed using horizontal and vertical lines only. Color is then added to the completed outline, again using the normal video graphic system facilities. Thus, color print densities, typically in yellow, magenta, cyan and black, are entered for each area or feature to be colored. As the operator works, the video graphic system stores the coded color value for each of the pixels within its working area. Thus the second input can represent for example edges, borders and rectangular tint blocks or cutouts as well as color for the more complex shape of the original outline.

When the operator's input is complete, the total mask information for the page may be output to produce a set of separation films. The expose or output side of a color scanner is employed, typically the expose side of the color scanner employed to derive the first output from the original outline. The scanner is thus reset, and the films to be exposed, together with any necessary screens are placed on the scanner output or exposure drum. Normally separation one in each of yellow, magenta, cyan and black as are normally required for lithography are produced.

The scanner expose side must be supplied with first signals corresponding to the first output derived from the original outline, in combination with a second output representing the extra material generated by operation of the video graphic system. The latter is available in the video graphic system store and the former can be obtained by a second scanning of the original, which has been retained on the scanner input drum.

To effect the combination of the original and video graphic systems outputs, the invention provides an interpolartor device. Means is provided for generating clock signals which recur at suitable spatial intervals in the line and frame direction along the scanner output or expose drum. During the output scan, data is called up from the video graphic system store on a line-by-line basis, the interpolator stores for use several lines of data at any instant, the pixel bytes or words being called up by the clock signals. The interpolator requires to know how the color in each pixel is to be treated and the necessary control information is stored as part of the color value code. The instantaneous value of the output signal is determined by comparison of the signal from the scanner input with the pixel color value and the color values of the surrounding pixel, the interpolator storing several lines of data at any instant to permit this comparison. During the output scan the colour value codes are converted to print densities by use of a look up table. The stored control information thus instructs the interpolator as to how the called up signals are to be treated.

When the separations representing the mask information have been produced, they can be combined with separations for the picture information and the whole page can then be assembled by use of a contact frame or by a similar photographic process.

Carrying the invention into effect in the manner just described requires the original to be retained on the scanner analysis drum after the first output has been supplied to the video graphic system through the anti-aliasing means, and during the generation of the second output by operation of the system, so that the first output can be repeated for the final output scan. To free the scanner after the initial scan has been performed, the first output may be stored in a suitable data store with the full spatial resolution of the scanner, at the same time as it is being transferred to the video graphic system. The first output is then recalled during the output scan for combination by the interpolator with the second output, obtained from the video graphic system.

Alternatively, the first output could be obtained not from scanning an outline original, but from some other form of input device with a spatial resolution comparable with the required output resolution, for example, a computer aided design facility. For the output scan, the output derived from this input device could be repeated, or it may again be stored for recall when the output scan is begun.

The invention has various applications, for example the addition of color to monochrome originals such as maps, drawings and cartoons, but is particularly applicable to the generation of masks in color page reproduction when there would normally be available an original in the form of a drawing or line shot of a required mask layout. The invention can also be employed to produce "burn-out masks" to size picture information separations.

BRIEF DESCRIPTION OF THE DRAWINGS

FIGS. 7 and 8 are priority diagrams relating the operation of the interpolator device.

DETAILED DESCRIPTION OF THE INVENTION

Figure 1:
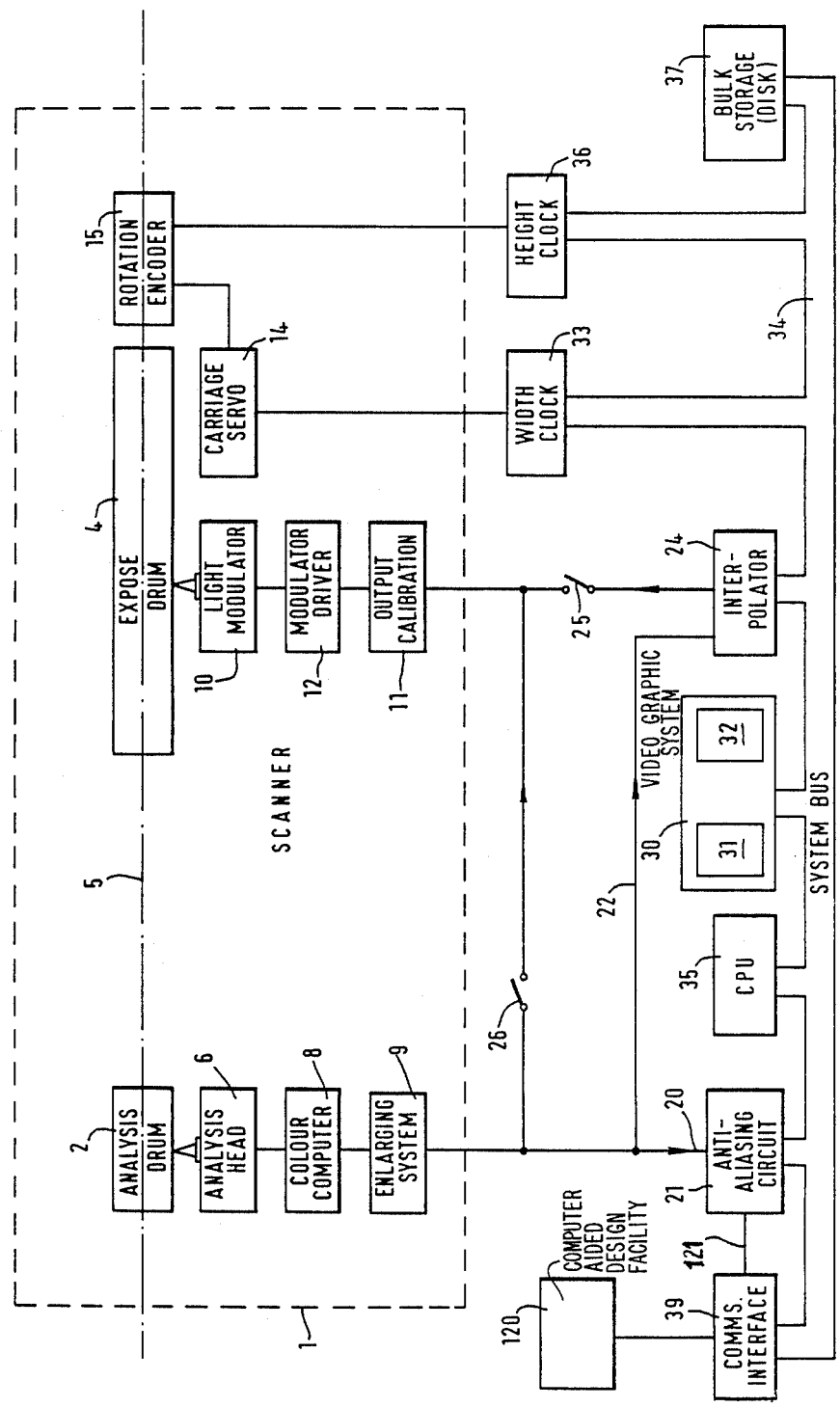
FIG. 1 is a schematic block diagram of a system for generating page make-up masks in accordance with the invention.

Referring now to the drawings and in particular to FIG. 1 thereof, there is shown a page make-up apparatus comprising a color scanner 1, with an analysis or input cylinder or drum 2 and an output or expose cylinder or drum 4, both drums being mounted for rotation on a shaft 5.

Associated with the input drum 2 is a scanning or analysis head 6 mounted on a carriage for movement axially of the drum as the latter rotates, the head being arranged to produce color component signals representing the color component densities of successively scanned elements of a colored original placed on the input drum. Signals from the head 6 are supplied to a color computer 8, in which corrections can be applied, and from the computer to an enlarging system 9 in which the signals from the computer 8 are modified to provide an output by which the original can be reproduced on a selected larger or reduced scale.

The scanner 1 also incorporates an exposure head or light modulator 10 associated with the expose drum 4. The light modulator 10 is mounted on a carriage capable of movement axially of the drum 4 as the later rotates and provides a light output to expose film on the drum in accordance with signals received from an output calibration circuit 11 by way of a modulator driver device 12. The carriages mounting the analysis head 6 and the light modulator 10 are controlled by a servo mechanism 14 deriving its input from a rotation encoder 15 fixed to rotate with the shaft 5.

The output of the enlarging system 9 at the analysis side of the scanner 1 is taken on line 20 to an anti-aliasing circuit 21 and on line 22 to an interpolator-device 24, having an output through a switch 25 to the output calibration circuit 11.

With the switch 25 open to isolate the interpolator device 24 from the output calibration circuit 11, the scanner 1 can be used conventionally by closure of a switch 26. The enlarging system output is then applied to the light modulator 10 by way of the calibration circuit 11 and the driver device 12, and a plurality of color separations, conventionally in yellow, cyan, magenta and black, and derived from a colored original scanned on analysis drum 2, can be provided on the expose drum 4.

After treatment by the anti-aliasing circuit 21, the enlarging system output is supplied to a video graphic system 30 and to related additional circuitry, so as to permit the generation of masks for use with color picture originals to complete the make-up of a page for reproduction in accordance with the invention. The video graphic system 30 includes a display means or monitor 31, typically a cathode ray tube (CRT), and manual input means 32.

The anti-aliasing circuit 21 functions to reconcile the different resolutions of the scanner 1 and the video graphics system 30. A bus 34 interconnects the circuit 21, the video graphics system 30 and a central processor unit (CPU) 35 which controls the transfer of signals from the circuit to the system. Besides clock signals in the CPU 35, two kinds of clock signals are employed in the system, namely, width clock and height clock signals. The width clock signals recur at intervals corresponding to spacings along the axis of the drums 2 and 4, and are supplied to the bus 34 from a width clock 33 in which the signals are generated in response to data from the carriage servo mechanism 14. The height clock signals recur at intervals corresponding to spacings circumferentially of the drums and are generated by a height clock 36 from data obtained from the encoder 15. The bus 34 also extends to a large capacity memory or bulk store 37, for example a hard disc drive, and to an interface 39.

In use of the apparatus of FIG. 1, a mask original which includes a geometrically accurate outline of any complex shapes required in the final mask, is placed on the drum 2 and scanned by the head 6. The output so obtained from the analysis side of the scanner 1, after treatment by the anti-aliasing circuit 21, generates a display on the monitor 31 of the video graphics system 30.

The resolution of the video graphic system 30 is low compared with that of the scanner 1; a video graphic system pixel may have an area more than a 100 times that of the scanner pixel, so the anti-aliasing circuit 21 averages the voltage from all the scanner pixels within each video graphic pixel area. Typically, the mask original contains only two density levels corresponding to an outline and the background. Normally, the background will be represented by a signal level of 0 volts and the outline by a level of say $+X$ volts. If the average voltage within a scanner pixel exceeds $+X/2$ volts, more than half the area is black and the anti-aliasing circuit 21 will deliver a data byte to the video graphics system which will be a unique code, for an outline pixel for example 09 (in hexadecimal notation), whilst the background will be represented by another code, for example 08. The average voltage for the scanner pixels lying along one scan line through the video graphics pixel area can be obtained by integrating the voltage and comparing it with a fixed reference. This technique is appropriate where the time taken to traverse a pixel is fixed, but where the pixel size or drum speed is varied, an alternative technique described below with reference to FIGS. 2 and 3 can be employed. This second technique comprises comparing the integrated voltage with that from another integrator fed continuously with half the black level voltage.

Figure 2:
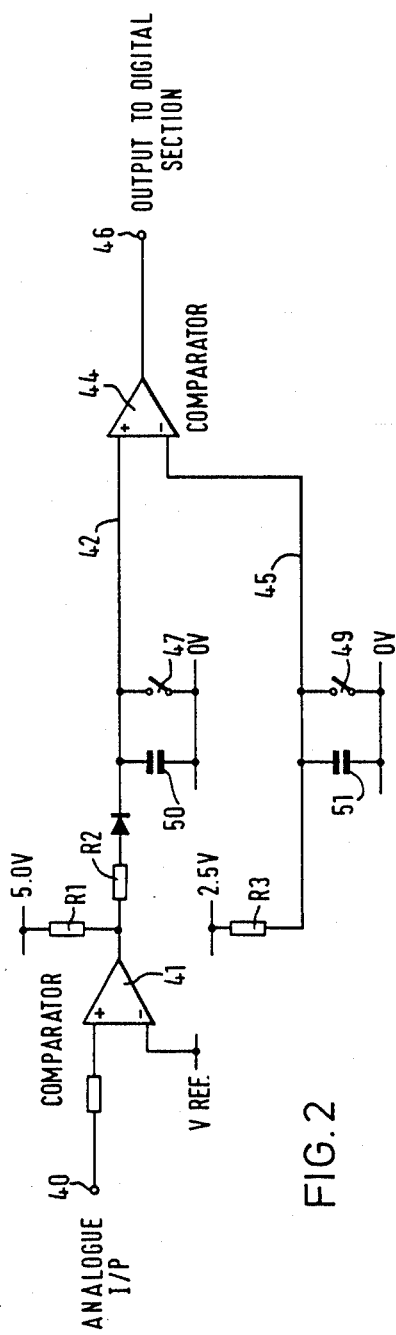
FIG. 2 outlines an analogue portion of an anti-aliasing circuit included in the system of FIG. 1.
Figure 3:
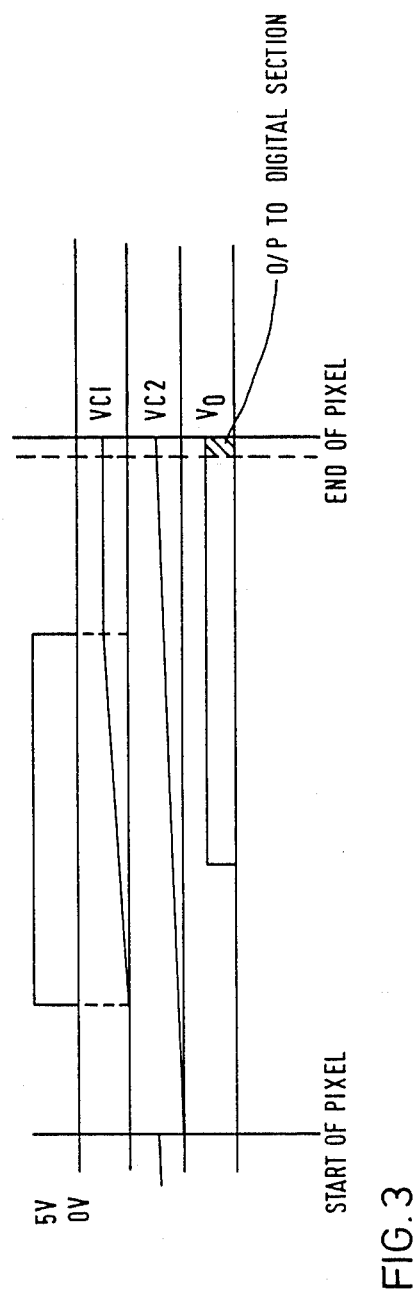
FIG. 3 illustrates voltage occurring in the circuit of FIG. 2.

Referring to FIGS. 2 and 3, the input to the anti-aliasing circuit 21 at terminal 40 is applied to a comparator 41, the other input of which is connected to a suitable reference voltage. The comparator output is integrated and the integrated signal VC1 is fed on line 42 to the second comparator 44. The other integrated signal VC2 reaches the comparator 44 on line 45 and the output Vo appears at terminal 46 as a 1-bit digital signal. Switches 47, 49 are then closed for a sufficient period to discharge the respective associated integrating capacitors 50, 51 for reception of an input derived from the next pixel.

Figure 4:
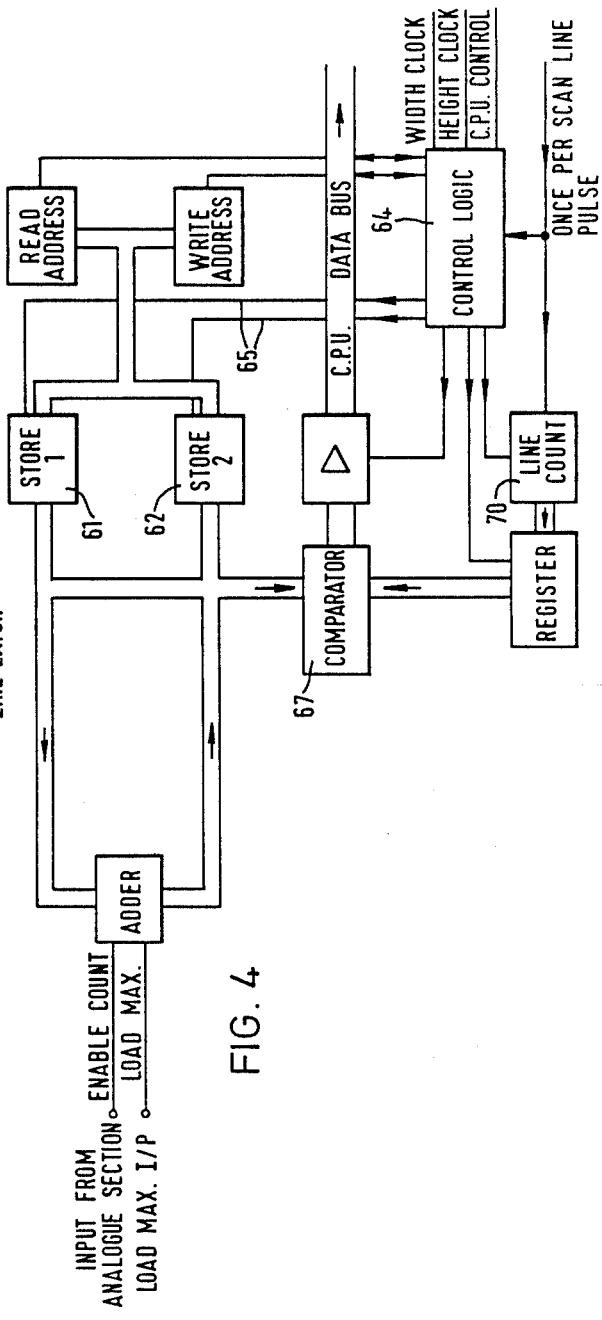
FIG. 4 is a block diagram of a digital portion of the anti-aliasing circuit.

To produce an average for all scanner lines through the video graphics pixel, the 1-bit output at terminal 46 is used in the digital circuitry of FIG. 4 to increments the contents of a store location in one or other of stores 61, 62 corresponding to the pixel being scanned. The two stores 61, 62 are provided so that one can be used in this way whilst the other is accessible by the CPU 35 so that the stored values from the last line of pixels can be transferred to the video graphics system 30. The functions of the two stores 61, 62 are interchanged at the beginning of each column of pixels by signals from control logic circuitry 64 conveyed on lines 65.

The contents of all locations of the store employed to receive the input are zero before the first scan line through the pixel is made, and the contents after the last scan are the number of black scan lines in the pixel. This number is compared in comparator 67 with the total number of scan lines in the pixel obtained from a counter 70 on the basis of signals from the width clock 33. Where over more than half of the lines are black, the output is the black color value code 09. Otherwise, the output is the background code 08.

Figure 5:
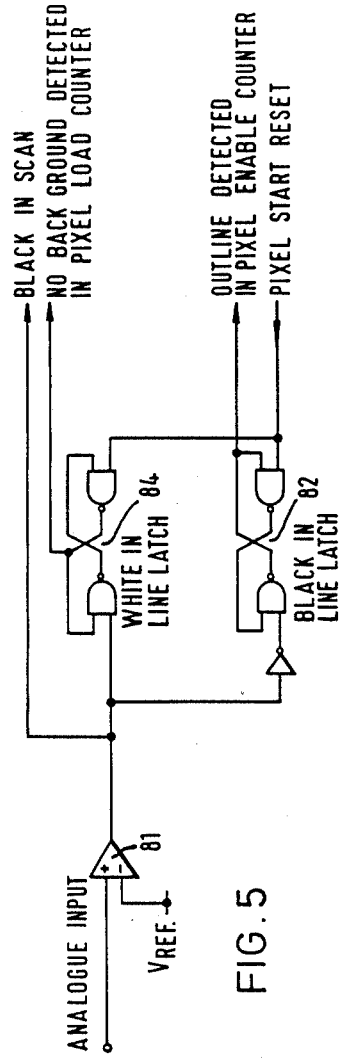
FIG. 5 is a block diagram of a circuit alternative to the circuit of FIG. 4.

As an alternative to the analogue technique described with reference to FIG. 2, there may be used a purely digital technique which is better able to detect transitions where the outlines of the original cut the rows or columns of video graphic pixels. Referring to FIG. 5, the analogue input signal enters the circuit via a comparator 81 arranged to provide a high output when a part of the outline of the original has been detected. The comparator output is employed to set a "black-in-line" latch 82. A second or "white-in-line" latch 84 is cleared as the scan enters the pixel and will be set when the comparator output goes to low, so indicating that the outline has been lost. Thus if the scan line runs along part of the outline the latch 84 will remain cleared. An outline portion lying along the line of scan is as important as a portion perpendicular to it, which would be detected on each scan through the pixel, so the portions should have a similar effect on the black line count. This is achieved by loading the line counter 70 with a maximum count value and including in the circuit a detector which detects a full count and inhibits further signal count pulses which would be enabled by the setting of the black in line latch 82. The two stores 61, 62 are operated in exactly the same way as in the hybrid case.

The output obtained from the scanner analysis side, after treatment by the anti-aliasing circuit 21 as described, is received by the video graphics system store, for example a random access memory (RAM). The video graphics system is then used by the operator to add extra information as is needed to generate the required page.

To enable this to be done, an image of the original outline is displayed on the monitor 31 of the video graphic system 30. Using this image as a guide, the operator can add if required any additional outline material to the original by use of the manual input means 32 of the system. The operator may thus use the system tablet or he may enter co-ordinates by way of the system keyboard. The video graphics system 30 is thus used in accordance with its capabilities to add simple horizontal and vertical lines, to produce edges, and borders as well as rectangular tint blocks or cut outs all of simple form than the usually rather complex outlines provided on the mask original.

When the mask layout has been completed in this way, if required, print densities, typically in yellow, magenta, cyan and black, are entered for each area or feature to be colored. The operator does this by use of the facilities of the video graphic system 30. The required densities may be entered for each feature, or standard colors may be used by calling up color values from an existing pallette of pre-defined tints. As the operator works, the video graphic system 30 stores the color value for each of the pixels within its working area. When this work has been completed, full color range information together with outline information reduced to low spatial resolution signals is stored in the video graphic system store. This stored information provides an output which is combined by the interpolator 24 with an output corresponding to that originally obtained from the analysis side of the scanner 1, which contains high spatial resolution outline information. The combined output, by which the required separations are produced needs to have the full color information stored in the video graphic system and the full outline information of the original analysis side output. The interpolator 24 thus co-ordinates the inputs to the final step of mask generation obtained from the mask original, which is again scanned on the analysis drum 2, and the additional mask material inserted manually by way of the video graphics system 30.

When the separations are being generated, the interpolator 24 requires to know how the color in each pixel is to be treated, and the necessary control information is stored as part of the color value code. The color value code can conveniently be an 8 bit byte the two most significant bits being used for control, with the 256 available colour values divided into 4. Groups each of 64 values may be arranged as follows:

(1) Code value 00 to 3F (in hexadecimal notation). Undefined colors reserved for internal system functions such as the initial value of the background and the colors of detected outlines.

(2) Code values 40 to 7F. Outline colors.

(3) Code values 80 to BF. Transparent colors or tints, where the edges of color blocks are defined by outlines.

(4) Code values C to FF. Opaque colors which are used to provide rectangular color blocks and other features assembled on the video graphic system using vertical and horizontal lines. These colors override the scanned outline.

During the output scan, the color value codes are converted to print densities using a look-up table. Each of the 192 codes available to the operator will select a color defined to the full color resolution of the scanner.

To produce the required separations, the expose drum 4 is loaded with appropriate film and any necessary screens, and the scanner 1 reset for a second scan of the outline original on the analysis drum 20. During this second scan of the original, a raster dump of the pixel values is made on a line-by-line basis from the video graphic system 30. The lines are called up by the output system when the input scan is approaching the column represented by that line. The interpolator 24 has to decide what color signal is to be supplied to the scanner expose side, when the data supplied to it from the video graphics system 30 and the scanner analysis side are in contradiction.

Such a contradiction will arise where a video graphics pixel area consists in part of a black outline, the rest of the area being the background color. If more than 50% of the scanner pixels within the video graphic system pixel were black, this entire pixel will have been regarded as a black pixel within the video graphic system so the contradiction arises in respect of the minority of scanner pixels which will be indicated as background color in the scanner output. In respect of these scanner pixels, the interpolator 24 functions to select the most probable color from the color values of the surrounding pixels and the interpolator output is then a signal representing the color value. A similar situation necessarily exists where less than 50% of the scanner pixels in a video graphics system pixel are black, with the result that the video graphic system allocated a color value to the pixel. When black is detected in one of the scanner pixels, the interpolator 24 again examines the surrounding pixels for the most probable outline color. The interpolator thus functions essentially as a data selector.

Figure 6:
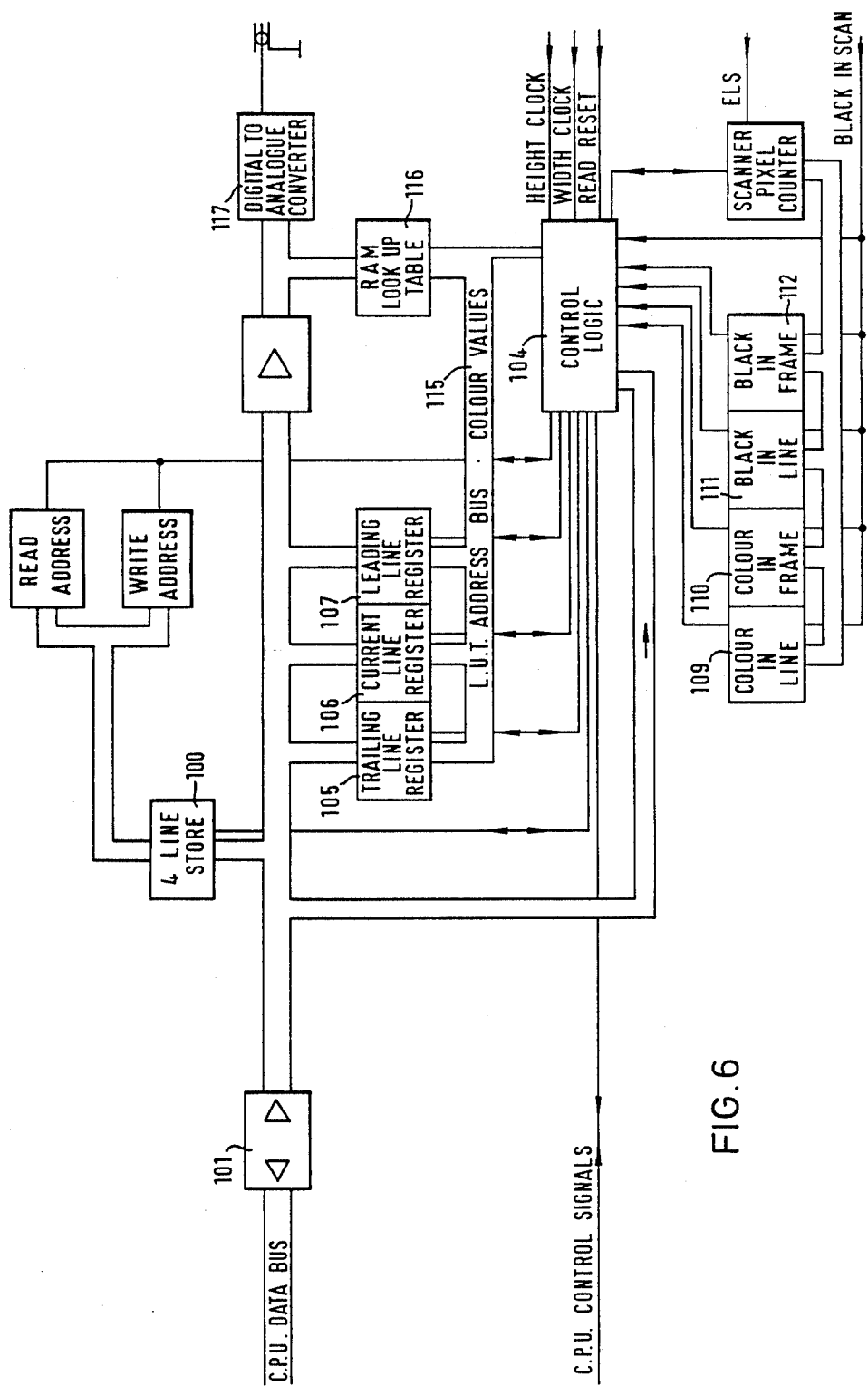
FIG. 6 is a block diagram of an interpolator device included in the system.

In a simple form of the interpolator 24, illustrated in FIGS. 6-8, only the color values of the current pixel and those immediately adjacent to it are used. Data is thus required from three lines of the video graphic system raster, so that nine pixel color values are available at any instant for selection. Since the scanner resolution is higher than that of the video graphic system, each video graphic pixel will be traversed several times during the output scan.

To reduce to a minimum the number of transfers from the video graphic system along the CPU bus 34 to the interpolator 24, the interpolator circuit includes a four (4) line store 100. At any instant, the store is three quarters full of data required for selection, and the remainder is available to accept data from the bus 34. The interpolator is connected onto the CPU bus at an I/O port 101, transfer to and from this port being controlled by the CPU 35. The control signals used can include a decode of the three least significant address bus lines which are used to select various memory mapped locations within the circuit. During the output, scan lines of information are transferred every width clock distance increment as the result of an interrupt to the CPU 35 generated by control logic 104. To allow rapid access to the color value of the current pixel and to those of the adjacent pixels, three line registers 105, 106, 107 are provided. Transfers to these registers occur continuously, as the light modulator 10 travels across the expose drum surface, in response to pulses from the height clock 36. These transfers are interleaved with the video graphic system transfers by the control logic 104.

At the same time as the color code is transferred to the registers 105, 106, 107, the two most significant bits are stripped off and fed to the control logic 104; these define the color type.

Five inputs into the control logic 104 provide information on the current state of the high resolution data stream and also on changes which have occurred during the present scan and previous scan lines across the current video graphics pixel. The stored data is held in a color-in-line store 109, a color-in-frame store 110, a black-in-line store 111 and a black-in-frame store 112.

When there is a contradiction between the two data streams about the color type, the control logic 104 selects the most probable colour value on a priority basis illustrated in the priority diagrams of FIGS. 7 and 8. The relevant priority tables are stored in a read only memory (ROM) which forms part of the control logic 104. In all cases, the highest priority color of the required type will be output, and in the diagrams the highest priority is the lowest number.

By way of an example, suppose an outline is lying across the bottom right-hand corner of a black pixel. On the first scan line through the pixel, no black will be detected, so the priority diagram in the top left corner of FIG. 7 applies in which black-in-scan, black-in-line and black-in-frame are all zero, that is, BIS=0, BIL=0, BIF=0. The preferred direction is up and to the left, which is towards the last area to be scanned. When the outline is reached (BIS=1) the color printed will be the selected outline color which is the color value of the current pixel. When the outline has been travered, the priority changes to that in the lower left corner (BIS=0, BIL=1, BIF=1). The preferred direction is now down and to the right.

The selected color value is output from the line registers 105, 106, 107 onto a look-up-table (LUT) bus 115 for transmission to a random access memory 116 serving as a look-up-table. The look up table converts the color code into a signal which will produce the required print density in the color being exposed. In the circuit illustrated, the device output is provided as an analogue signal, by means of a digital to analogue converter (DAC) 117, which would be suitable for driving a conventional scanner modulator amplifier such as the modulator driver 12.

The color value codes used in different apertures will always start from the lowest values in each block, with additional codes being taken in numerical order as required. The LUT is loaded for each new job operation, to convert each color code into the print density in all colors. This can be done by transfer from the video graphic system 30 each time the operator defines a new color. Writing into the LUT involves writing the new color code into the current pixel location in the current line register; during set-up, the contents of this location always appear on the LUT address bus 115. In addition to this 8 bit byte, two more bits are needed; these are the two most significant bits and select the output color. These bits are stored in a status register of the control logic 104 and are set to select the required output color before there may be transferred from the CPU 35 a further byte which represents the print density in that color. Normally yellow, magenta, cyan and black print densities for each color code will be transferred in turn, the color bits being set in the status register before each transfer. Before exposure the color select bits will be set for the required separation and the buffer will be closed so that the LUT drives the DAC 117 direct with the converted code value.

The basic interpolator 24 described has a limited field of view and can make errors where a complex outline feature for example, a junction of several lines, occurs. To eliminate such errors, the area represented by each video graphic pixel may be reduced or alternatively more than 8 adjacent elements may be used. As the field of view is increased, pattern recognition may be used in place of strict priority as a means of data selection.

For some work, it may be convenient to add additional outlines to the mask original which will be detected by the video graphic system 30 as different from the basic outlines which will normally be in black and white. If additions are made using color, a color recognition system can be used to feed a separate anti-aliasing system input. The additional system would include all the elements described above, up to the comparator. The second channel comparator could control an alternative bit in the output data word so that the second color would change the background code from hex 08 to 0A for example.

The technique described requires that the mask original be retained on the scanner analysis drum 2 after the initial input scan until the final output scan is made. To free the drums after the input scan has been completed, the original scan output can be recorded at the same time as the output is transferred to the video graphic system 30, however with the full spatial resolution of the scanner, in the bulk store 37. This recorded data is then used in place of the repeated scanner output during exposure of the separations. The data could be stored as a one bit map or a vectorial representation and would not occupy a large storage capacity.

As an alternative to performing an input scan, the original outline data could be supplied by another device with a spatial resolution comparable with the required output resolution, for example, a computer aided design facility 120. Such a computer aided design facility could be connected into the circuit of FIG. 1, for use in place of the analysis side of the scanner 1 by way of the communication interface 39. The facility output could be transmitted to the anti-aliasing circuit by a high speed data link 121.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

We claim

1. A method of producing color separations for use in page make-up, the method comprising the steps of:
generating a high spatial resolution first output, said first output representing an original outline comprising relatively complex features of a page to be made up from said color separations to be produced,
degrading said first output to produce a modified first output corresponding to a representation of said outline which cannot be reconstituted to produce said original outline and which has a spatial resolution compatible with a video graphics system,
supplying said modified first output to the video graphic system, said video graphic system including display means,
displaying on said video graphic system display means a version of said outline within the resolution capabilities of said video graphic system,
operating said video graphic system to generate a second output, said second output representing said outline with color added thereto,
combining said first and second outputs to produce a combined output,
supplying said combined output to an output device adapted to produce therefrom said color separations for use in page make-up, and
operating said output device to produce said color separations.

2. A method of claim 1 including the step of operating said video graphic system so that said second output includes signals representing a feature to be incorporated in the outline, said feature being composed only of lines parallel to the page edges.

3. The method of claim 1, and combining said first and second outputs by means adapted to decide between inconsistent color information in said first and second outputs arising from said degradation of said first output.

4. The method of claim 1 wherein said generation of said first output is performed by operation of a computer aided design facility.

5. The method of claim 1 wherein said generation of said first output is performed by the scanning of an original positioned at the analysis station of a color scanner.

6. The method of claim 5 including the steps of storing said first output in a memory and recalling said stored output from said memory after generation of said second output for combination with said second output.

7. The method of claim 5 wherein said original is retained at said scanner analysis station during said generation of said second output to be thereafter rescanned to provide a repeat of said first output for combination with said second output.

8. The method of claim 1 wherein said step of combining said first and said second output includes the step of resolving any conflict between color information in said first and second outputs on a probability basis by reference to areas adjacent the area in respect of which said conflict occurs.

9. An apparatus for producing color separations for use in page make-up, said apparatus comprising:
an input device for generating a first output representing an outline of features to be included in the page to be made up, said first output having high spatial resolution and restricted color range,
a video graphic system, said video graphic system comprising display means, a data store, and manually operable input means,
transmitting means for transmitting said first output to said video graphic system for display of an image of said outline on said system display means,
anti-aliasing means comprised in said transmitting means, said anti-aliasing means being adapted to average the portions of said high resolution first output representing the pixels of said input device which fall within the area of a pixel of said video graphic system to thereby provide a modified form of said first output of lower resolution appropriate to reception by the video graphic system,
combining means for combining said first output with a second output stored in said system data store by operation of said system input means, said second output having lower spatial resolution and more extended color range than said first output, to thereby provide a high spatial resolution output with the extended color range, and
an output device connected to receive said combined output and adapted to employ said output to produce said color separations.

10. The apparatus of claim 9 wherein said combining means comprises an interpolator means, wherein said second output contains a color value code identifying the color of each video graphic system pixel, and wherein said interpolator means includes a look-up table responsive to said color value codes to provide associated color print density signals in said combined output.

11. The apparatus of claim 9 wherein said input device for generating said first output comprises the analysis side of a color scanner.

12. The apparatus of claim 9 wherein said output device for producing said color separations comprises the output side of a color scanner.

13. The apparatus of claim 9 further comprising a data storage device adapted to store said first output and to supply said first output for combination with said second output subsequent to the generation of said second output.

14. The apparatus of claim 9 wherein said input device for generating said first output comprises a computer aided design facility.

15. The apparatus of claim 9 wherein said combining means comprises means adapted to resolve any conflict between color information in said first and second outputs on a probability basis by reference to areas adjacent the area in respect of which said conflict occurs.

16. An apparatus for producing color separations for use in page make-up, said apparatus comprising:
an input device for generating a first output representing an outline of features to be included in the page to be made up, said first output having high spatial resolution and restricted color range, a video graphic system, said video graphic system comprising display means, a data store, and manually operable input means, transmitting means for transmitting said first output to said video graphic system for display of an image of said outline on said system display means, said transmitting means comprising anti-aliasing means for modifying said high resolution first output to a lower resolution output appropriate to reception by the video graphic system, combining means for combining said first output with a second output stored in said system data store by operation of said system input means, said second output having lower spatial resolution and more extended color range than said first output, to thereby provide a high spatial resolution output with the extended color range, data selector means comprised in said combining means, said data selector means being adapted to decide between inconsistent color information in said first and second outputs in response to conflict between the color information in said first signal relating to an input device pixel and color information in said second signal relating to a video graphic system pixel containing said input device pixel by reference to color information in said second output relating to adjacent video graphic system pixels, and by selection from said adjacent video graphic system pixels on a predetermined priority basis, and an output device connected to receive said combined output and adapted to employ said combined output to produce said color separations.

17. The apparatus of claim 16 wherein said input device for generating said first output comprises the analysis side of a color scanner, and wherein said output device for producing said color separations comprises the output side of a color scanner.

18. The apparatus of claim 16 further comprising a data storage device adapted to store said first output and to supply said first output for combination with said second output subsequent to the generation of said second output.

19. The apparatus of claim 16 wherein said anti-aliasing means is adapted to average the voltage signals of said first output representing the pixels of said input device which fall within the area of a pixel of said video graphic system to provide said modified form of said first output for reception by said video graphic system.

20. The apparatus of claim 16 wherein said combining maans comprises an interpolator means, wherein said second output contains a color value code identifying the color of each video graphic system pixel, and wherein said interpolator means include a look-up table responsive to said color value codes to provide associated color print density signals in said combined output.

* * * * *